US012750611B2

(12) United States Patent
Chedore et al.

(10) Patent No.: US 12,750,611 B2
(45) Date of Patent: Sep. 29, 2026

(54) AUTO-PROVISIONING OPTICAL CHANNELS BASED ON SPECTRUM MONITORING

(71) Applicant: Ciena Corporation, Hanover, MD (US)

(72) Inventors: Paul Chedore, Ottawa (CA); Mark Hinds, Ottawa (CA); Nathan Lam, Ottawa (CA); Andrew Kam, Ottawa (CA)

(73) Assignee: Ciena Corporation, Hanover, MD (US)

( * ) Notice: Subject to any disclaimer, the term of this patent is extended or adjusted under 35 U.S.C. 154(b) by 258 days.

(21) Appl. No.: 18/591,296

(22) Filed: Feb. 29, 2024

(65) Prior Publication Data

US 2025/0280217 A1 Sep. 4, 2025

(51) Int. Cl.
*H04Q 11/00* (2006.01)
*H04B 10/079* (2013.01)

(52) U.S. Cl.
CPC ... *H04Q 11/0062* (2013.01); *H04B 10/07953* (2013.01); *H04Q 11/0005* (2013.01); *H04Q 2011/0016* (2013.01); *H04Q 2011/0083* (2013.01); *H04Q 2011/0086* (2013.01)

(58) Field of Classification Search
CPC ......... H04B 10/07953; H04Q 11/0062; H04Q 11/005
USPC ........................................................... 398/34
See application file for complete search history.

(56) References Cited

U.S. PATENT DOCUMENTS

| | | | |
|---|---|---|---|
| 6,236,499 | B1 | 5/2001 | Berg et al. |
| 6,786,647 | B1 | 9/2004 | Hinds et al. |
| 6,920,287 | B1 | 7/2005 | Hinds et al. |
| 8,364,036 | B2 | 1/2013 | Boertjes et al. |

(Continued)

FOREIGN PATENT DOCUMENTS

| | | | |
|---|---|---|---|
| CN | 114285465 | A | 4/2022 |
| DE | 600 07 803 | T2 | 7/2004 |

(Continued)

OTHER PUBLICATIONS

Zhang Huan et al., "Demonstration of a Disaggregated ROADM Network with Automatic Channel Provisioning and Link Power Adjustment," 2021 European Conference on Optical Communication (ECOC), IEEE, Sep. 13, 2021, 3 Pages.

(Continued)

*Primary Examiner* — Amritbir K Sandhu
(74) *Attorney, Agent, or Firm* — Baratta Law PLLC; Lawrence A. Baratta, Jr.

(57) ABSTRACT

Systems and methods are provided for automatically provisioning channels in an optical spectrum. A process, according to one implementation, includes a step of monitoring a Media Channel (MC) at an ingress/egress degree of an optical line system configured for operation within an optical spectrum including at least a plurality of MCs. The monitored MC has a spectral range including one or more Network Media Channels (NMCs) assigned to a customer device. Each of the one or more NMCs are provisioned as either a data-loaded signal or a noise-loaded signal. In response to detecting a change in presence of a signal within a modified NMC of the one or more NMCs, the process further includes a step of automatically re-provisioning the modified NMC within the optical spectrum to change the (Continued)

NMC between a data-loaded signal and a noise-loaded signal.

20 Claims, 6 Drawing Sheets

(56) References Cited

U.S. PATENT DOCUMENTS

| | | | | |
|---|---|---|---|---|
| 8,971,705 | B2 * | 3/2015 | Boertjes | H04J 14/02212 398/38 |
| 9,768,902 | B2 | 9/2017 | Al Sayeed et al. | |
| 10,237,633 | B2 * | 3/2019 | Chedore | H04J 14/02122 |
| 10,277,352 | B2 | 4/2019 | Chedore et al. | |
| 10,439,709 | B1 * | 10/2019 | Al Sayeed | H04J 14/0212 |
| 10,454,609 | B2 | 10/2019 | Chedore et al. | |
| 10,615,867 | B1 | 4/2020 | Bhatnagar et al. | |
| 10,630,417 | B1 | 4/2020 | Chedore et al. | |
| 10,778,327 | B2 | 9/2020 | Chedore et al. | |
| 10,826,601 | B2 | 11/2020 | Bhatnagar et al. | |
| 10,826,641 | B1 * | 11/2020 | Al Sayeed | H04J 14/0209 |
| 10,833,791 | B1 * | 11/2020 | Al Sayeed | H04J 14/0206 |
| 11,108,489 | B1 | 8/2021 | Archambault et al. | |
| 11,272,269 | B1 * | 3/2022 | Chedore | H04J 14/02122 |
| 11,444,719 | B2 | 9/2022 | Al Sayeed et al. | |
| 11,502,746 | B2 | 11/2022 | MacKay et al. | |
| 11,838,101 | B2 | 12/2023 | Chedore et al. | |
| 11,990,933 | B2 * | 5/2024 | Al Sayeed | H04B 10/296 |
| 12,506,555 | B2 * | 12/2025 | Cai | H04J 14/0201 |
| 2002/0083374 | A1 | 6/2002 | Hinds et al. | |
| 2003/0123880 | A1 | 7/2003 | Boertjes et al. | |
| 2007/0206512 | A1 | 9/2007 | Hinds et al. | |
| 2007/0208840 | A1 | 9/2007 | McConville et al. | |
| 2017/0117983 | A1 * | 4/2017 | Al Sayeed | H04B 10/07955 |
| 2018/0269964 | A1 * | 9/2018 | Mertz | G02B 6/02061 |
| 2020/0076499 | A1 * | 3/2020 | Al Sayeed | H04J 14/021 |
| 2020/0313380 | A1 * | 10/2020 | Pei | H01S 3/06779 |
| 2022/0256263 | A1 * | 8/2022 | Al Sayeed | H04J 14/0257 |
| 2022/0329318 | A1 | 10/2022 | Mehta et al. | |
| 2023/0412267 | A1 * | 12/2023 | Piciaccia | H04J 14/02216 |
| 2024/0080093 | A1 * | 3/2024 | Al Sayeed | H04B 10/0797 |
| 2025/0192911 | A1 * | 6/2025 | Gong | H04B 10/2537 |
| 2025/0280217 | A1 * | 9/2025 | Chedore | H04Q 11/0005 |

FOREIGN PATENT DOCUMENTS

| | | | |
|---|---|---|---|
| EP | 3 621 218 | A1 | 3/2020 |
| EP | 3 741 054 | B1 | 12/2021 |
| EP | 3 804 184 | B1 | 6/2022 |
| WO | 2022211898 | A1 | 10/2022 |

OTHER PUBLICATIONS

Jun. 24, 2025, European Search Report issued for European Patent Application No. EP 25 16 0708.

* cited by examiner

AUTO-PROVISIONING OPTICAL CHANNELS BASED ON SPECTRUM MONITORING

FIELD OF THE DISCLOSURE

The present disclosure generally relates to optical communication networks. More particularly, the present disclosure relates to systems and methods for auto-provisioning optical channel adding and dropping based on spectrum monitoring.

BACKGROUND

Optical networks are realized with equipment that is configured to multiplex/demultiplex different channels at different locations onto optical spectrum. There can be degree forming equipment such as a Wavelength Selective Switch (WSS) which interfaces to local channels on one side for add/drop and to the optical network on a line side. The process of capacity changes on the line side generally involve various provisioning steps. A capacity change is channel additions, channel deletions, or combinations thereof. Of note, capacity changes and the associated provisioning steps require manual intervention, even if some of the equipment supports automation. There is another case where the optical network includes an optical line system operated by a line system owner and one or more customers that share the optical line system, such as based on leasing a portion of the optical spectrum from the line system owner. This adds complexity to the capacity change process. In such sharing scenarios, to implement a capacity change, communication is required between the line system owner and the customer. However, this adds complexity and delays for the spectrum lessee who wishes to make provisioning changes.

BRIEF SUMMARY

The present disclosure is directed to systems and methods for automatically provisioning optical channels in an overall optical spectrum based on changes in the occupancy of channels. In one implementation, a process for automatically provisioning Network Media Channels (NMCs) in an optical spectrum may include a step of monitoring a Media Channel (MC) at an ingress/egress degree of an optical line system configured for operation within an optical spectrum including at least a plurality of MCs. The monitored MC has a spectral range including one or more NMCs assigned to a customer device. Also, each of the one or more NMCs is provisioned as either a data-loaded signal or a noise-loaded signal. In response to detecting a change in presence of a signal within a modified NMC of the one or more NMCs, the process includes a step of automatically re-provisioning the modified NMC within the optical spectrum to change the NMC between a data-loaded signal and a noise-loaded signal.

According to some embodiments, the noise-loaded signal may be an Amplified Spontaneous Emission (ASE) filled signal spectrum. The step of detecting the change in the presence of the signal may include discovering the presence of a new data-loaded signal. In this case, the step of automatically re-provisioning the modified NMC within the optical spectrum may include the steps of a) removing an ASE filled signal spectrum from the optical spectrum, and b) adding the new data-loaded signal to the optical spectrum. The step of detecting the change in the presence of the signal may alternatively include discovering an absence of a previously existing data-loaded signal. In this case, the step of automatically re-provisioning the modified NMC within the optical spectrum may include the steps of a) removing the previously existing data-loaded optical signal from the optical spectrum, and b) adding an ASE filled signal spectrum to the optical spectrum.

The process may be further configured whereby the step of automatically re-provisioning the modified NMC may be performed without intervention by a network operator associated with the optical line system or a customer associated with the customer device operating over leased spectrum. The ingress/egress degree, for example, may be part of a Reconfigurable Optical Add/Drop Multiplexer (ROADM) device or a Wavelength Selective Switching (WSS) component of the optical line system. In some embodiments, the optical spectrum may be provisioned for a plurality of customer devices each associated with a different MC of the plurality of MCs. Also, each MC may have a different spectral range including one or more NMCs, wherein the step of automatically re-provisioning may be performed independently for each customer device. In some embodiments, the one or more NMCs may include a plurality of NMCs having a variable range of wavelengths and a variable range of acceptable Power Spectral Density (PSD) levels. The process may further include a step of initially provisioning a customer plan as a baseline before the step of monitoring the MC, where the customer plan may be configured, among other things, to partially define the spectral range of the MC. The step of detecting the change in the presence of the signal within the modified NMC may include a comparison with the baseline.

In various embodiments, the present disclosure may include 1) methods and processes having the above-mentioned steps, 2) systems including at least one processor and memory with instructions that, when executed, cause the at least one processor to implement the above-mentioned steps, and 3) non-transitory computer-readable media having instructions stored thereon for programming at least one processor to perform the above-mentioned steps. Also, while described for spectrum sharing, such as in either submarine or terrestrial deployments, the approach described herein can be used with a single service provider to streamline provisioning.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure is directed to systems and methods for automatically provisioning optical channels in an overall optical spectrum based on changes in the occupancy of channels. The present disclosure includes a novel placement of a spectrum monitoring device, namely before degree equipment or within the degree equipment (WSS) prior to any line side multiplexing/demultiplexing, i.e., the spectrum monitoring is after channel multiplexing/demultiplexing but before the line side multiplexing/demultiplexing. The location of the spectrum monitoring device enables automated monitoring of spectrum occupancy which can enable an automated process for capacity changes based thereon. This can speed up any changes in spectrum sharing scenarios, as well as streamline operational effort in all scenarios.

Figure 1:
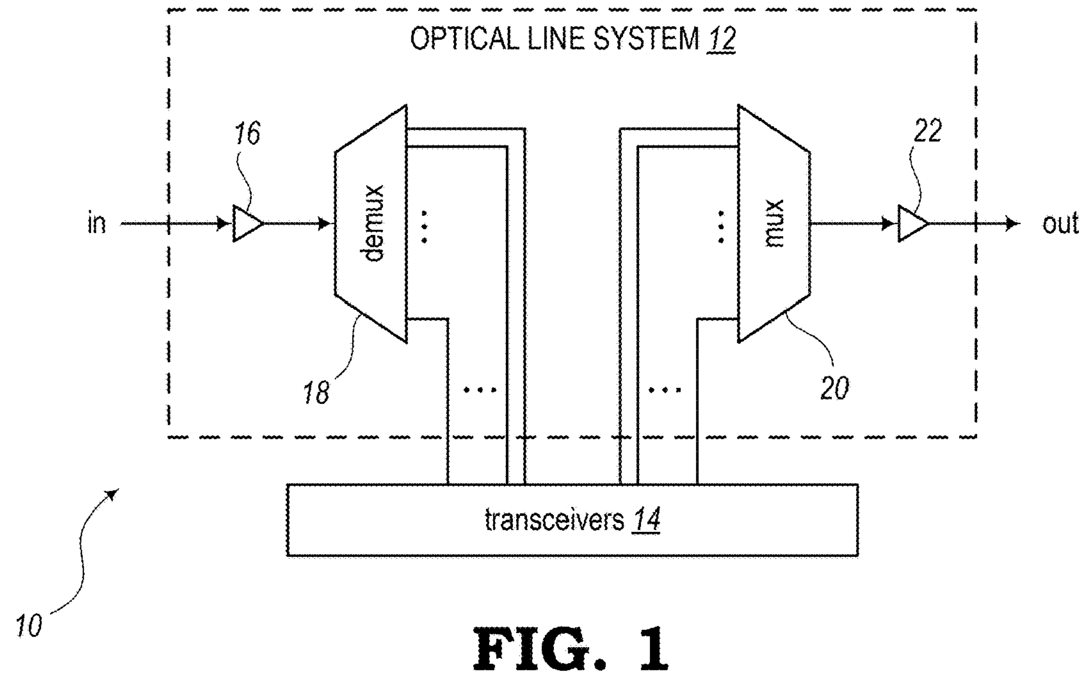
FIG. 1 is a schematic diagram illustrating an optical line system.

FIG. 1 is a schematic diagram showing an embodiment of a system 10 in simplified form, where the system 10 is configured for adding and dropping optical channels. The system 10 includes an optical line system 12 receiving optical signals from other parts of an optical communications network (not shown). The optical channels can be passed through to an output of the optical line system 12 and propagated to other parts of the optical communications network. Some optical channels can also be passed to transceivers 14 for processing the signals. The transceivers 14 may be an end point for some signals that are dropped from the optical line system 12 and may also be a source for new signals that are added to the optical line system 12. The optical line system 12 can be a single degree which includes an input fiber and an output fiber. Of course, practical embodiments of a Reconfigurable Optical Add/Drop Multiplexer (ROADM) in an optical network can include multiple degrees.

The optical line system 12, for example, may include a pre-amplifier 16 (pre-amp) for amplifying incoming signals and passing the signals to a demultiplexer 18 (demux). For example, the demultiplexer 18 may be configured as a 1×M device with one input and M outputs, the M outputs being directed to the transceivers 14 and/or being passed through to a multiplexer 20 (mux). The multiplexer 20, for example, may be an N×1 device with N inputs and one output. In some cases, M may be equal to N. The selected output is provided to a post-amplifier 22 (post-amp) for amplifying the output optical signals to be passed to the other parts of the communications network. Of course, practical embodiments can include other equipment which is omitted for simplicity of illustration.

Automatically Provisioning Channels in an Optical Spectrum

Figure 2:
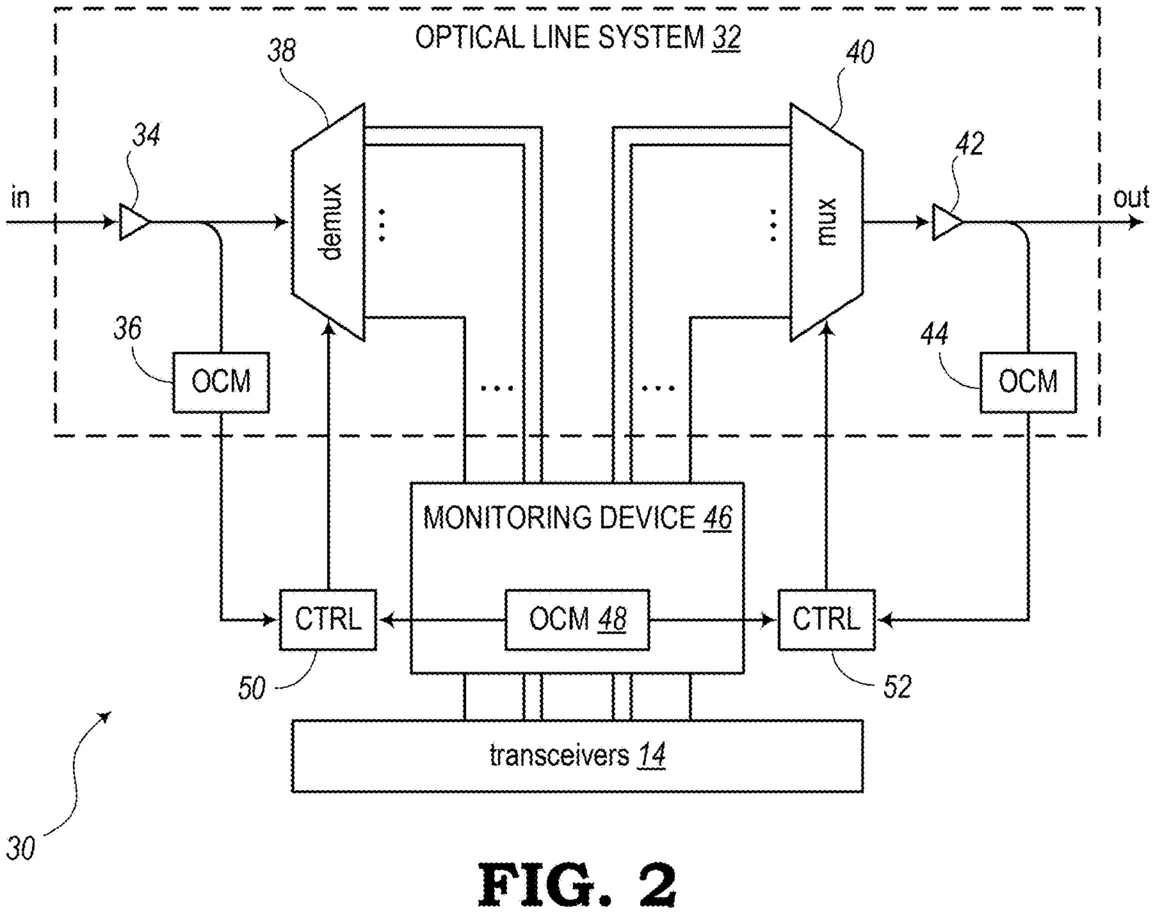
FIG. 2 is a schematic diagram illustrating an optical line system with monitoring and controlling functionality, according to various embodiments.

FIG. 2 is a schematic diagram illustrating an embodiment of a system 30 for automatically provisioning optical channels. In addition to the normal functionality of the system 10 of FIG. 1, the system 30 in this embodiment is configured to monitor changes to incoming optical signals and changes to outgoing optical signals. Of course, typical channels in an optical network include an incoming optical signal and an outgoing optical signal, for bidirectional communication. As such, the present disclosure assumes each channel includes bidirectional communication, but this does not necessarily have to be the case.

In response to detecting a new optical channel, the system 30 is configured to automatically provision or instantiate that new channel in the specific spectral range for a corresponding customer (again, there can be a single customer as well, i.e., this does not necessarily have to be limited to spectrum sharing applications). Also, in response to detecting when a customer begins using a new channel, the system 30 is configured to automatically provision or instantiate that new channel in the specific spectral range associated with the customer. Similarly, the system 30 detects when existing incoming or outgoing channels are no longer present and, in response to absent channels, can automatically provision or reconfigure the spectral range for the customer to drop those channels, including replacement with ASE.

Thus, the system 30 includes monitoring and control functionality for auto-provisioning the optical spectrum. The auto-provisioning can be performed based on a pre-defined agreement between the customer and a line system owner (e.g., service provider) and without the need for ongoing communication between the customer and line system owner. This allows the customer to have access to a specific range of spectrum based on an initial upfront arrangement, where the customer can then use the specific range of spectrum whenever they want without further channel adding and dropping procedures.

As shown in FIG. 2, the system 30 includes an optical line system 32 having Wavelength Selective Switching (WSS) and Wavelength Division Multiplexing (WDM) capabilities. The optical line system 32 may be part of a Reconfigurable Optical Add/Drop Multiplexer (ROADM) node having X ingress/egress degrees for communication with X other nodes in an optical communication network (not shown). Again, the pair of "in" and "out" paths may represent a single degree. The optical line system 32 may be used for terrestrial and/or submarine applications, i.e., the present application contemplates both applications.

The optical line system 32 includes a pre-amp 34, an ingress Optical Channel Monitoring (OCM) device 36, a demux 38, a mux 40, a post-amp 42, and an egress OCM device 44. Demultiplexed signals from the demux 38 are provided to transceivers 14 via a monitoring device 46 also having an OCM device 48. Furthermore, the system 30 includes an ingress controller 50 and an egress controller 52. The ingress controller 50 receives information about monitored channels from the ingress OCM device 36 and the OCM device 48. Also, the egress controller 52 receives information about monitored channels from the egress OCM device 44 and the OCM device 48. The ingress controller 50 is configured to control the demux 38 to thereby reconfigure or re-provision the receiving of optical channels with respect to the spectrum. Also, the egress controller 52 is configured to control the mux 40 to thereby reconfigure or re-provision the transmitting of optical channels with respect to the spectrum. Note, the monitoring device 46 is shown with multiple ports and embodiments can include a single port with a single channel as well as with a number of multiplexed channels, as well as multiple ports each with a single channel as well as with a number of multiplexed channels.

Figure 4:
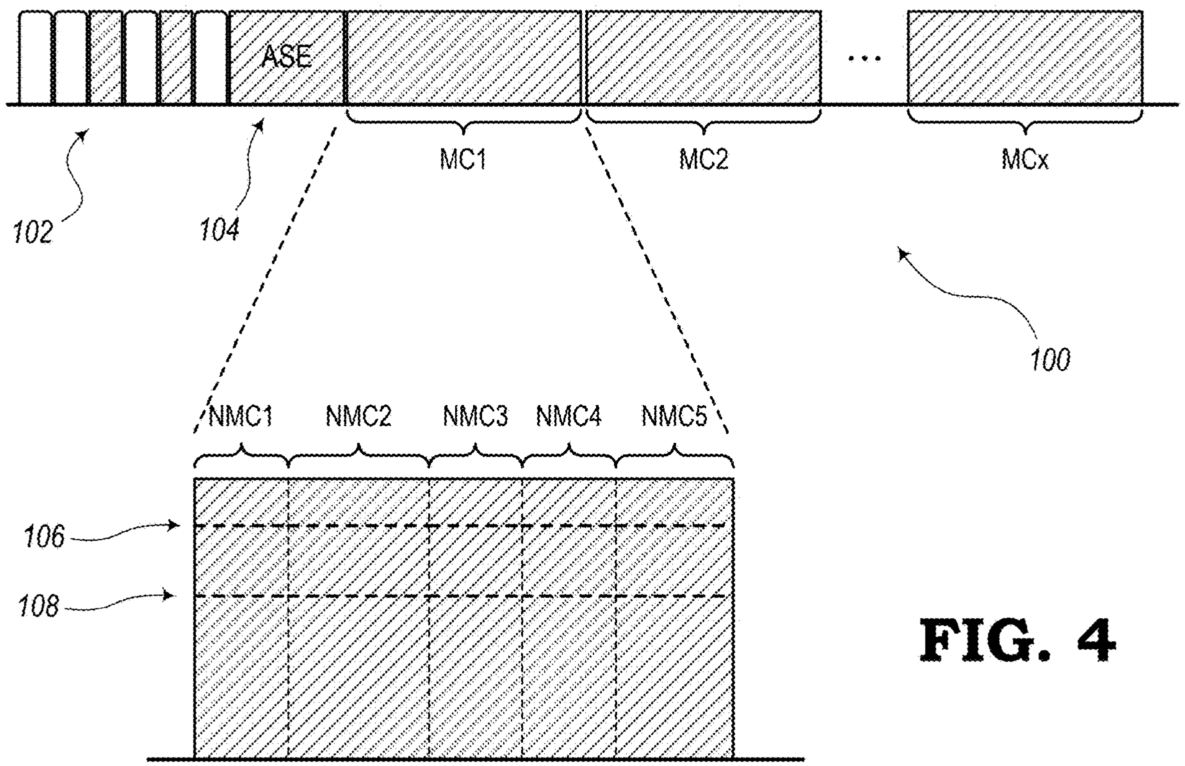
FIG. 4 is a diagram illustrating an optical spectrum including a plurality of Media Channels (MCs) for a plurality of customers, according to various embodiments.
Figure 5:
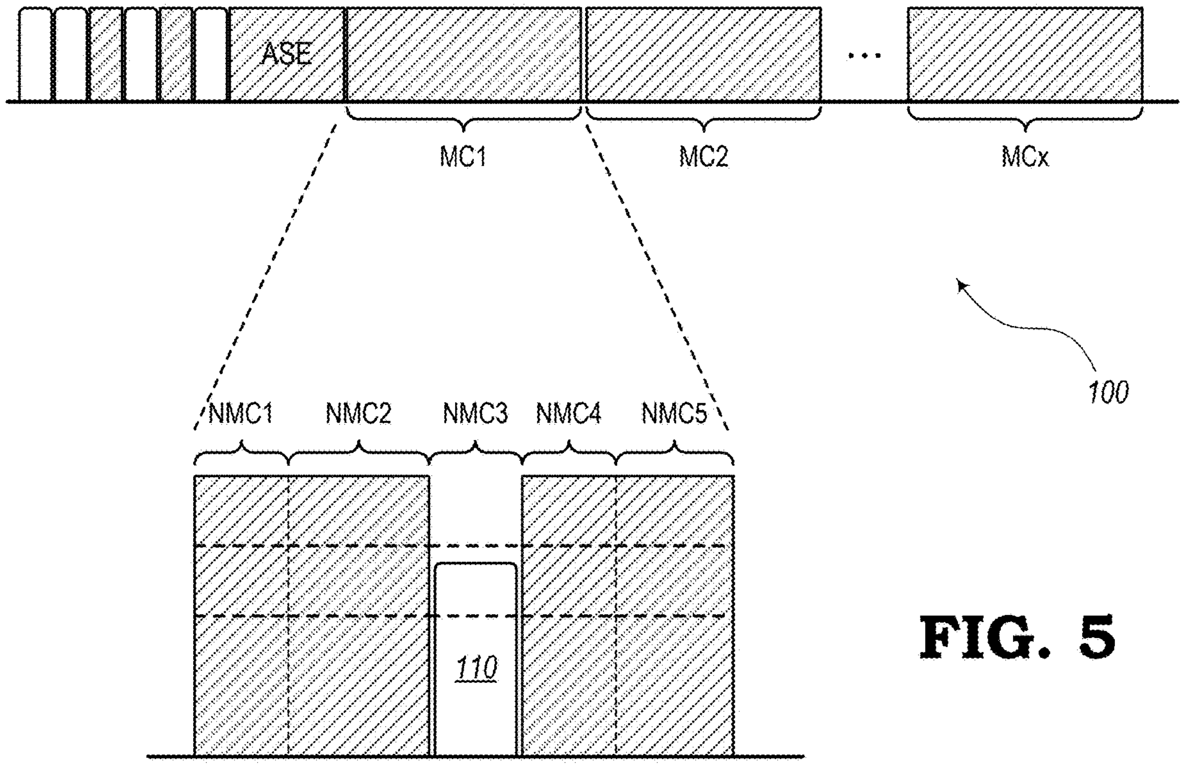
FIG. 5 is a diagram illustrating the optical spectrum of FIG. 4 where the presence of a Network Media Channel (NMC) of a specific MC is detected, according to various embodiments.
Figure 6:
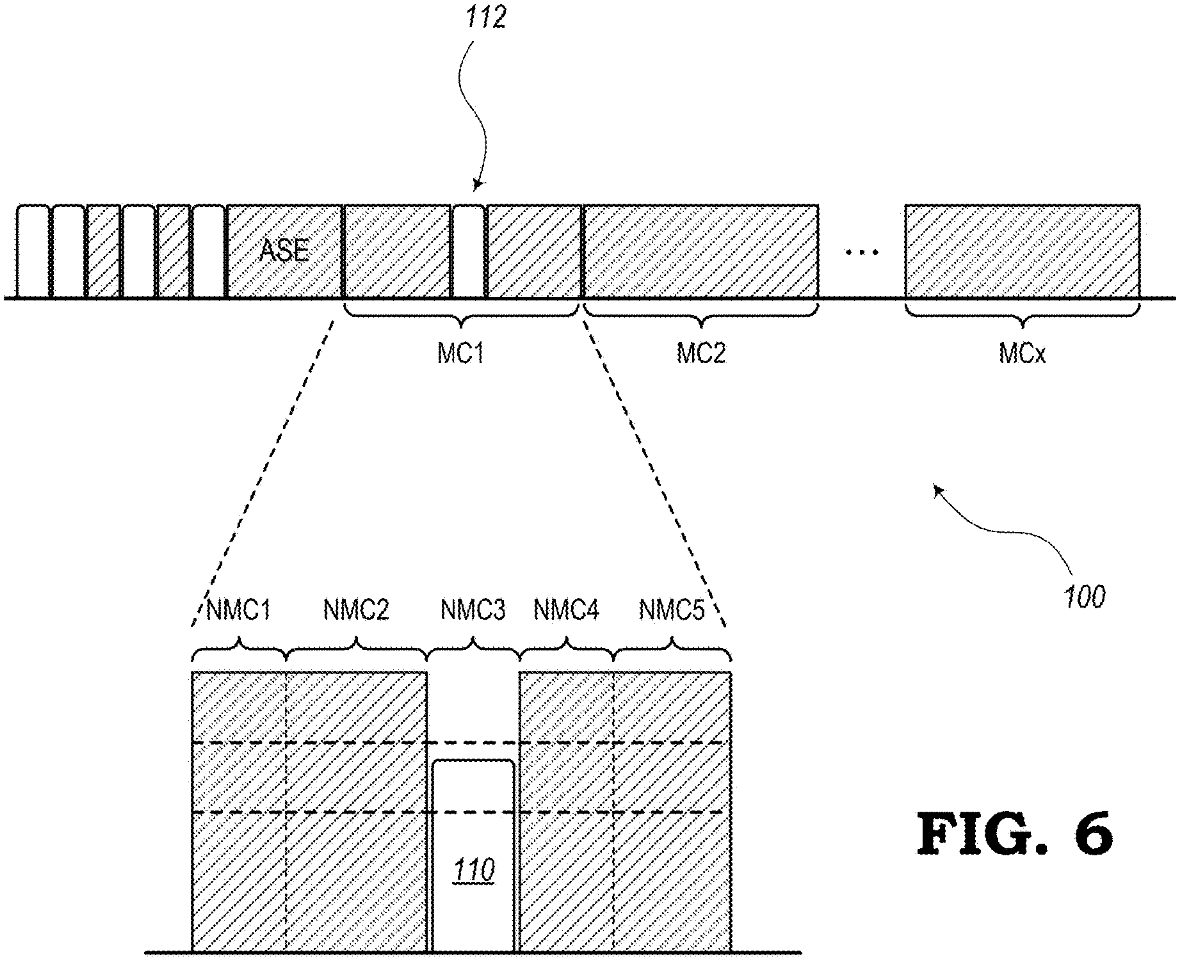
FIG. 6 is a diagram illustrating the optical spectrum of FIGS. 4 and 5 where the detected NMC is provisioned in the optical spectrum, according to various embodiments.

It should be noted that the optical line system 32 is configured to operate using any range of optical spectrum. For example, the optical line system 32 may utilize optical wavelengths in the C-band, which range from about 1530 nm to 1565 nm. In another example, the optical line system 32 may utilize optical wavelengths in the C+L-bands, which range from about 1530 nm to 1625 nm. In some cases, the spectrum may be divided up into 80 channels with 50 GHz spacing. According to more recent developments, the optical spectrum can be divided up into even more channels with even less spacing to allow for an even greater density of data transmission. In other words, optical communication systems today allow fiber optic cables to carry greater and greater amounts of data than ever. In further embodiments, the optical spectrum can be gridless or a flexible grid, where there is no actual division, but channels can be anywhere, with any size. Optical spectrum sharing examples are shown in FIGS. 4-6 and described in further detail below.

Regarding the aspect of "spectrum sharing," optical communication systems are able to logically partition the optical spectrum (e.g., C+L bands) on a fiber cable. Normally, the partitioning involves submarine (or subsea) cables, such as transcontinental fiber optic cables for different end users. However, according to the embodiments described in the present disclosure, partitioning can also be applied to terrestrial fiber cables as well. Multiple end users can share a common hardware platform (e.g., optical line system 32). In order to provide significant flexibility, partitioning allows each end-user to have their own "virtual fiber pair" subdivided from the overall spectrum of the system. Again, the techniques described herein are not limited to spectrum sharing, but can be used by a single service provider.

Specifically, the idea of spectrum sharing was originally intended for the submarine sector of the communications industry. Now, as described herein, spectrum sharing can also be applied to terrestrial systems. This allows individual end users or customers to buy or lease capacities greater than a few wavelengths, yet less than acquiring a full fiber pair, which would be seen as a service overkill as well as extremely expensive. Also, a customer can lease an amount of spectrum, such as in flexible grid.

In the environment of submarine or subsea communication systems, one important consideration for communicating optical signals over a long distance is the aspect of maintaining a relatively equalized power level of the optical signals. With the absence of optical signals at one or more channels, fluctuations in the power level can cause issues over long propagations distances. Therefore, to keep the overall spectrum at a substantially constant power level, it is common, especially with submarine cables, to add Amplified Spontaneous Emission (ASE) into the unused or vacant spots within the spectrum to emulate a fully filled system. Of course, the ASE signals can be random noise and are not processed at the opposite end but are merely used as a filler to maintain the constant power level, across the entire optical spectrum. As described in the present disclosure, ASE filling can also be used in terrestrial systems for the same purpose of power level consistency. Terrestrial systems can use other types of dynamic power management techniques, but ASE noise loading can be used with the same level of success as this simplifies optical power management. As new channels are added, ASE channels can be dynamically replaced with the actual data-carrying traffic channels. Also, as the data-carrying channels are dropped, ASE channels can be dynamically inserted to replace them. That is, capacity changes become a switch between ASE and data-carrying traffic channels with the overall power being about the same before and after the capacity change.

Again, the shared spectrum approach may be applied to the terrestrial space. Traditionally, it was not thought to be a feasible option for terrestrial spectrum customers to be expected to independently ASE-load unused parts of the spectrum, as opposed to submarine use cases in which these customers are typically responsible for a greater amount of spectral range management. Injecting ASE would typically force an interaction between the line system owner (e.g., service provider) and spectrum customer whenever a provisioning change is required, which undesirably adds complexity and delay. For example, in some cases, it may take weeks or months for a line system owner to process a channel add procedure. Even if this approach was optimized, it still would not be instantaneous and require coordination. However, the optical line system 32 is configured to inject ASE where channels are not present by establishing an initial plan with customers to provision Network Media Channels (NMC) as needed. In the systems and methods of the present disclosure, the optical line system 32 is configured to set up an agreement with the line system owner to utilize a small range of wavelengths within the overall spectrum as the user has need. Thus, the customer can add or delete channels on the fly, as long as the channels are confined to the pre-arranged Media Channel (MC) that is assigned to the customer.

The monitoring device 46 is configured to provide spectral visibility of the entire spectrum of the optical line system 32, before it is added to the optical line system, and can provide multiple customers, which are associated with the transceivers 14, with the ability to manage their own slice of the overall spectrum as needed without additional communication with the line system owner during regular operation. This allows the optical line system 32 to automatically add or delete channels according to need of each individual customer. The monitoring device 46 (e.g., call it a Shared Spectrum Monitor (SSM)) enables the optical line system 32 to understand if and when a signal shows up at the WSS input of the mux 40. Then based on pre-provisioning, this signal could be added automatically. Similarly, the channel cross-connect can be deleted automatically if it falls outside the acceptable range.

Not only beneficial for shared spectrum type applications, the optical line system 32 with automatic add/drop capabilities are also useful in that it minimizes the amount of interaction required between the line system owner and spectrum customer. The spectrum customer would no longer need to communicate with the line system owner every time a channel adding or deleting process is required. Instead, the spectrum customer could initially share their channel plan with the line system owner once and this plan could be pre-provisioned. Then, when needed during normal operations, the spectrum customer can add or delete channels without having to further communicate with the line system owner or wait for them to get around to processing the request. Also, it is possible for the auto-detection of signal occupancy and then automated NMC provisioning.

Figure 3:
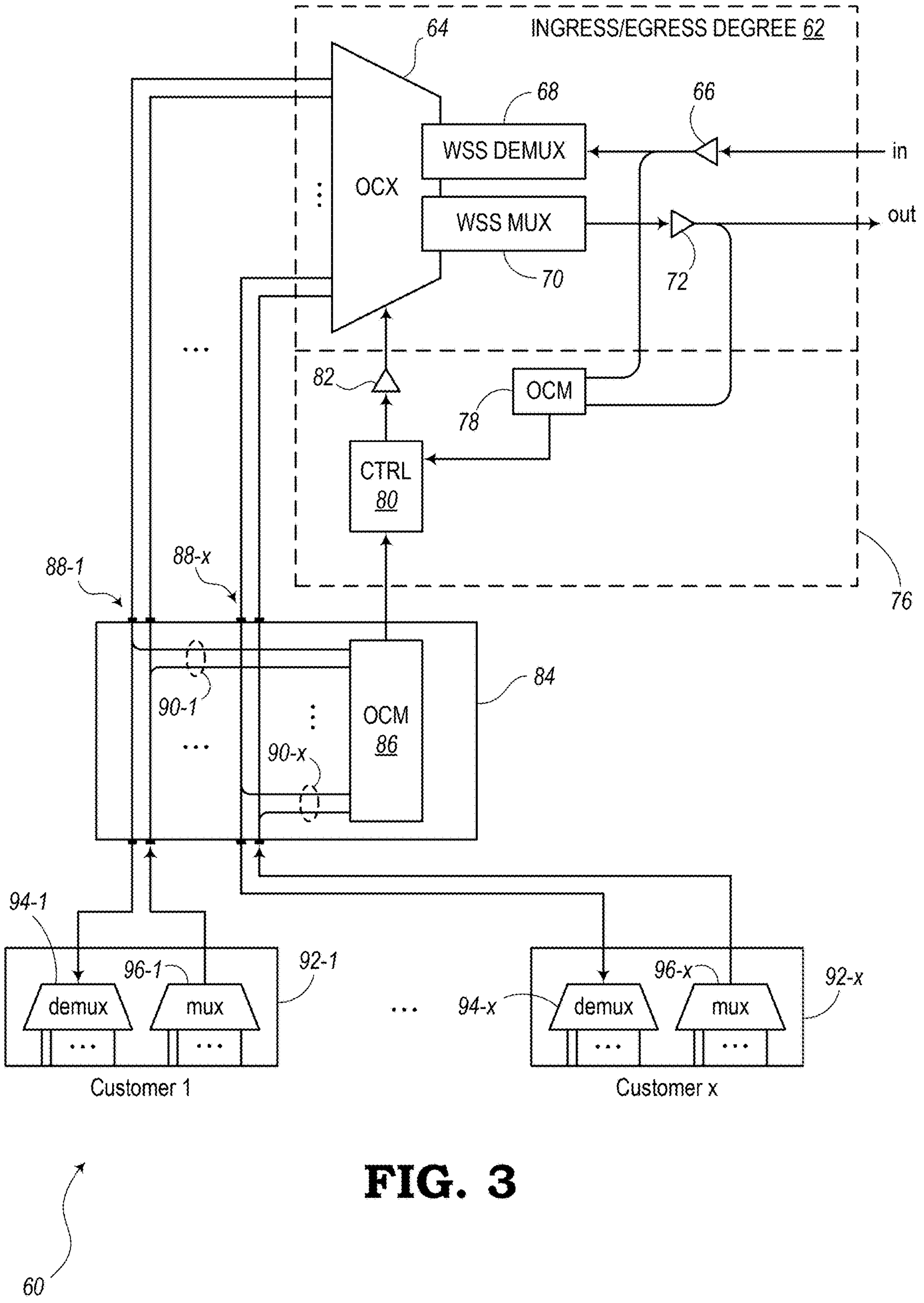
FIG. 3 is a schematic diagram illustrating an optical line system for enabling automatic provisioning of optical channels, according to various embodiments.

FIG. 3 is a schematic diagram illustrating an embodiment of a system 60 having similarities with the system 30 of FIG. 2 with regard to monitoring and automatically controlling channel provisioning in an optical communication system. As shown in FIG. 3, the system 60 includes an ingress/egress degree 62 including an Optical Cross-Connect (OXC) device 64 for channel cross-connect functionality. The ingress/egress degree 62 further includes a pre-amp 66 and a Wavelength Selective Switching (WSS) demux 68, a WSS mux 70, and a post-amp 72, such as via the WSS mux 70.

The system 60 further includes an auto-configuring device 76 for monitoring and controlling spectrum to automatically provision or reconfigure channels according to need. The auto-configuring device 76 includes an Optical Channel Monitor (OCM) 78, a controller 80, and an amplifier 82, for injecting ASE. The OCM 78 is configured to monitor the presence, usage, or occupancy of data-carrying channels in the spectrum at the line side of the ingress/egress degree 62. The controller 80 is configured to receive input from both the OCM 86 and other spectrum monitoring input.

Furthermore, the system 60 includes a spectrum monitoring device 84, which includes, among other things, an OCM 86. The OCM 86, in this embodiment, is configured to tap into bidirectional passthrough lines between the OXC device 64 and customer systems (e.g., transceivers). As shown, pairs of bidirectional optical lines from the OXC device 64 are introduced in the spectrum monitoring device 84 at port pairs 88-1 through 88-*x*, representing a number (x) of customers based on spectrum sharing and the division of spectral ranges for each customer. In some embodiments, the number x may represent dozens or even hundreds of customers and depends on the subdividing of each Media Channel (MC) for each customer. Taps 90-1 through 90-*x* are connected to the passthrough lines and are supplied to the OCM 86 to allow the OCM 86 to monitor the channels (e.g., MCs) for each customer. As described below with respect to FIGS. 4-6, the MC may further be broken down into one or more Network Media Channels (NMCs), representing a further subdividing of the customer's MC as needed. The spectrum monitoring device 84 is shown as a separate box in FIG. 3 but those skilled in the art will appreciate it could be integrated in hardware with any devices in the system 60, e.g., in a module for the ingress/egress degree 62.

The system 60 also includes a plurality of customer devices 92-1 through 92-*x* for customer 1 through customer x, respectively. The customer devices 92-1 through 92-*x* have applicable optical communication equipment (e.g., receivers, transmitters, amplifiers, signal processing devices, etc.) for receiving and transmitting optical signals through the ingress/egress degree 62. As shown, each customer device 92 includes at least a demux 94-1 through 94-*x* and a mux 96-1 through 96-*x* for processing the slice (e.g., MC) of spectrum assigned to the respective customer.

Note, the OCMs 48, 86 are illustrated in the monitoring devices 46, 84. Those skilled in the art will recognize the OCMs 48, 86 can be the same devices, as can the monitoring devices 46, 84. Also, the monitoring devices 46, 84 are illustrated as separate modules in the various embodiments of FIGS. 2-3. However, this does not necessarily have to be the case. The OCMs 48, 86, the monitoring devices 46, 84, and the associated functionality can be integrated into the optical line system 32 or the ingress/egress degree 62. Of note, the monitoring functionality by the OCMs 48, 86 just needs to occur before any WSS multiplexing/demultiplexing, to enable all the automatic provisioning techniques described herein. That is, while optical spectrum monitoring is typically performed in an optical network, such as on the line ports of the degree, at intermediate stages of line amplifiers, etc., there typically are not OCMs at the ingress/egress points of a degree. This is because there really has not been a need to monitor power at this location, since there already are the OCMs 36, 44, 78 on the line side. By incorporating the OCMs 48, 86 on the add/drop side, all the techniques described herein can be automated.

Sub-Dividing Optical Spectrum for Spectrum Sharing

FIG. 4 is a diagram illustrating an example of an optical spectrum 100 that is input through the "in" port of the ingress/egress degree 62 and/or output through the "out" port of the ingress/egress degree 62. The systems and methods of the present disclosure are configured to monitor channel presence, utility, or occupancy during normal operation (i.e., after pre-configuring arrangements). Also, this monitoring (and subsequent control) may be performed with respect to input signals (i.e., when other nodes are communicating new optical channels to the customer devices 92) and/or with respect to output signals (i.e., when customer devices 92 are adding or dropping optical channels with respect to communications with other nodes).

As shown in FIG. 4, the optical spectrum 100 includes one or more signals 102 (e.g., header information, etc.) and inserted ASE loaded signals 104. Furthermore, the optical spectrum 100 includes a number (x) of MCs representing the x customer devices 92. The optical spectrum 100 may be pre-arranged where each MC includes the same width, while, in other embodiments, the MCs may include different widths. In other words, a service plan for some customers may include a greater range of spectrum, which of course may be more expensive. The various service plans may include any tiers (or even variable) of spectral ranges.

Also, FIG. 4 shows that the MC for each customer can be broken down into further subdivisions, referred to as Network Media Channels (NMCs). In the example shown, customer 1 using customer device 92-1 may be assigned a first MC (MC1), which may include five NMCs. The NMCs also can have variable width and may be defined by the customer according to need. In the initial set-up stage of assigning MC1 to customer 1, the spectrum is originally empty (i.e., no data-carrying channels). In this initial stage, the spectrum may be filled with ASE to maintain the power level at a relatively constant level for the optical spectrum 100. However, in other embodiments, customer 1 may initially set up the agreement where one or more channels (NMCs) are configured from the start to allow immediate usage. The ASE-filled (empty) channels can then be filled with data-carrying signals as needed by the customer, in accordance with the teachings of the present disclosure.

In addition, each of the NMCs includes an upper Power Spectral Density (PSD) threshold 106 and a lower PSD threshold 108. In some embodiments, the PSD thresholds 106, 108 may be different for each NMC. When a new channel is added, the spectrum monitoring device 84 is configured to detect the wavelength range of the channel to determine which MC the channel is assigned to and further detects which NMC the channel is assigned to. If the new channel substantially matches the width of the corresponding NMC and includes a power level between the upper PSD threshold 106 and lower PSD threshold 108, then the spectrum monitoring device 84 can determine that the new channel is legitimate and can then add this channel by re-provisioning or reconfiguring the OXC device 64 using the controller 80, essentially instructing the OXC device 64 to automatically allow the usage of the new channel. Otherwise, if there is an error with respect to matching the new channel, information may be provided to the customer or customers informing them of the error and inability to reconfigure the optical spectrum 100. Similarly, if the user initiates the transmission of signals via a selected NMC, the controller 80 can update the OXC device 64 to re-provision the optical spectrum 100. Thus, a spectrum customer may communicate a channel plan and an acceptable PSD range with the line system owner for the spectral range they have been assigned.

FIG. 5 is a diagram illustrating the optical spectrum 100 when a new channel (NMC) is introduced. In this example, an optical signal 110 is detected having a spectral range that matches the wavelengths and width of NMC3 of MC1 for customer 1. Also, the power spectral density of the optical signal 110 is found to be between the upper PSD threshold 106 and lower PSD threshold 108 for the particular NMC. As such, the optical signal 110 is legitimate and can be added to the usable channels in the optical spectrum 100. Thus, the spectrum customer may add a channel on their assigned port of the spectrum monitoring device 84, where it is detected by the OCM 86.

FIG. 6 shows the example of FIG. 5, where the optical signal 110 is found to be legitimate. In this case, the ASE-filled portion of MC1 in the optical spectrum 100 is replaced with an optical signal 112 corresponding to the newly discovered optical signal 110. In other words, after detection of the presence of a new optical signal, the OXC device 64 is configured to provision the optical signal 110 to allow transmission of the optical signal 110 (for receiving and transmitting purposes). Thus, if the channel occupancy and PSD level meet the pre-defined requirements, then the optical line system 32 or ingress/egress degree 62 is configured to automatically add it to the line.

Control Device

Figure 7:
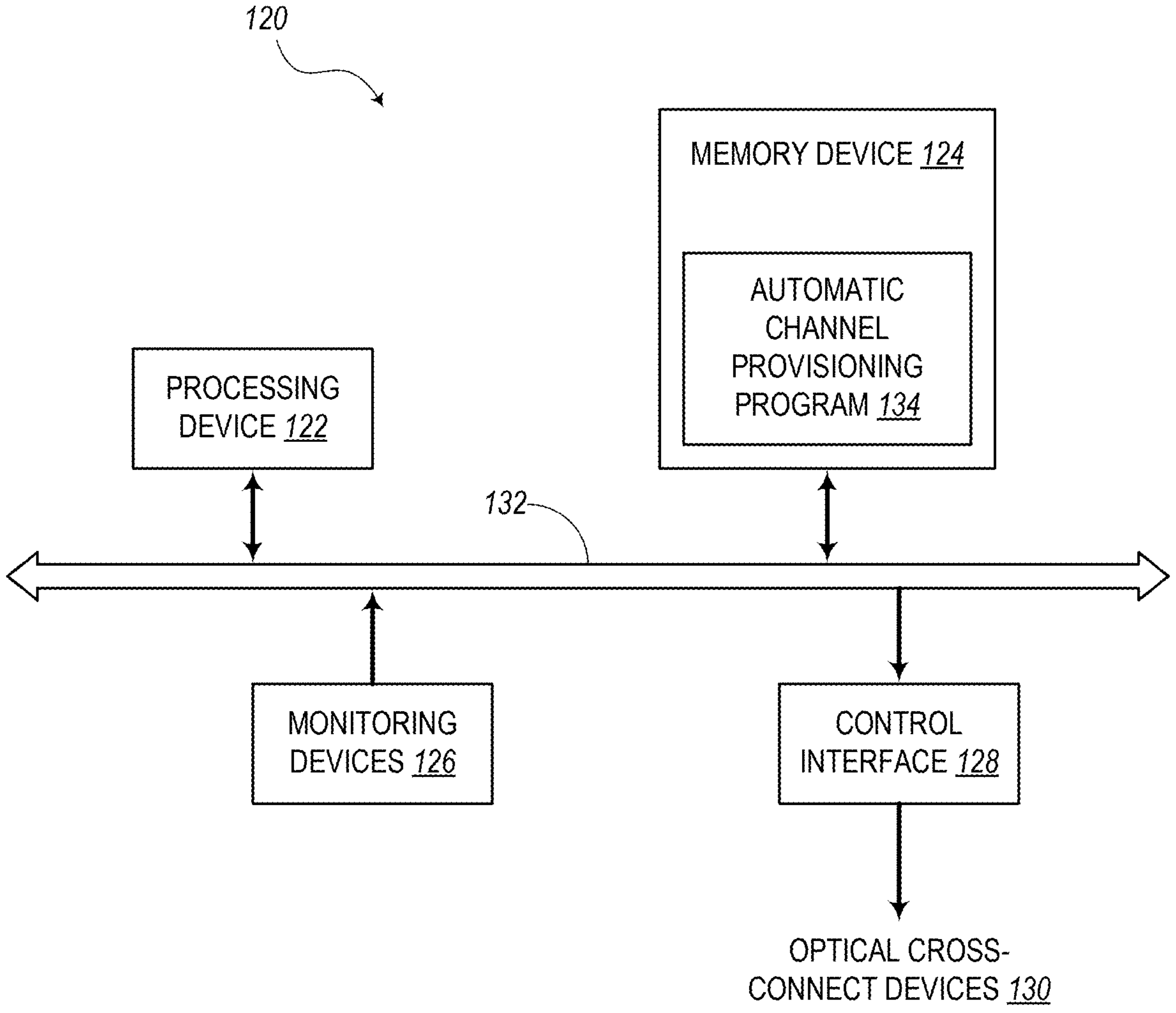
FIG. 7 is a block diagram illustrating a control device for monitoring the presence of optical signals and automatically provisioning NMCs into an optical spectrum, according to various embodiments.

FIG. 7 is a block diagram illustrating a control device 120 for monitoring the presence of optical signals and automatically provisioning NMCs into an optical spectrum. The control device 120 may represent the controllers 50, 52 shown in FIG. 2, 3 and/or the controller 80 shown in FIG. 3. In other embodiments, the control device 120 may represent any internal or external control device for managing optical systems, such as management, planning, and controlling systems, Network Monitoring Systems (NMSs), network operator systems, network administer systems, etc.

As shown in FIG. 7, the control device 120 includes a processing device 122, a memory device 124, one or more monitoring devices 126 (or interfaces for receiving data from telemetry components), and a control interface 128 for providing control to one or more Optical Cross-Connect (OXC) devices 130 (e.g., OXC device 64). The components 122, 124, 126, 128 may be configured to communicate with each other in an appropriate manner via a bus interface 132.

In the illustrated embodiment, the control device 120 may include an automatic channel provisioning program 134, which may be implemented in any suitable combination of hardware, software, firmware, etc. The automatic channel provisioning program 134 may be stored in a suitable non-transitory, computer-readable medium, such as the memory device 124, and may include computer logic or code having instructions for enabling or causing the processing device 122 to perform various functions, such as those described in the present disclosure with respect to provisioning or re-provisioning channels (NMCs) within an optical spectrum based on actual use. The use of new channels may include receiving optical signals from outside an optical line system via one or more previously unused NMCs and/or transmitting optical signals from one or more customers associated with the optical line system via one or more previously unused NMCs. Provisioning may also include the detection of NMCs no longer being used and filling these NMCs with ASE.

Again, provisioning and re-provisioning the spectrum can be performed in response to discovering changes (e.g., channel adding, channel dropping, etc.) with the current usage or occupancy of the various channels. The current usage or occupancy may be based on changes made inside or outside the line system. Customers may use pre-arranged portions of their MC, which can be discovered by the monitoring device. In this case, the re-provisioning (e.g., replacing ASE with data-carrying channel) can be instantiated immediately to allow the customer to use the channel. Also, external parties may transmit a new channel to the customer's MC. If this is the case, some extra steps may be needed to utilize the NMC, but it may be possible for the line system to re-provision the spectrum to allow the customer to connect for access to the transmission within a relatively short amount of time (e.g., 30 minutes or less), which is a significant improvement over conventional systems in which communication with the line system owner along with approval/processing by the line system owner may take several weeks.

Another concept of the present disclosure is to use the capabilities of the spectrum monitoring device 84 to discover incoming channels, where a channel would be defined as a contiguous block of adjacent pixels as measured by the on-board OCM 86. In this concept, the OCM 86 is configured to monitor to see if the incoming spectrum registers changes within a predefined frequency range where a perspective customer may turn up one or more channels over time.

One embodiment may include using the spectrum monitoring device 84 to discover new channels by OCM power discovery and instantiate them based on a minimum time of presence (e.g., 30 minutes). After this minimum time, a new foreign channel could be defined and automatically inserted in the spectrum. In some embodiments, a customer (or terminal owner or user) may confirm the provisioning to admit the new channel onto the system, which by its nature would remove the already instantiated ASE blocks. In some cases, the blocks may have a 12.5 GHz granularity based on current capabilities and/or Spectral Density Monitoring (SDMON) reporting resolution. In additional embodiments, the systems and methods of the present disclosure may be configured to work at 6.25 GHz resolution or greater, as well as any other resolution amount.

Referring again to FIGS. 4-6, the systems and methods of the present disclosure may use OCM to monitor incoming power levels at the customer ingress port for analysis by spectrum monitoring components. The systems may discover any new power greater than a minimum NMC width to detect a potentially new channel. Second, the systems may use the discovered channel power range to provision a new NMC and prompt or inform the user of this provisioning. Third, the systems may instantiate a new NMC on the optical line system or WSS line amplifier to admit the new channel while removing the currently existing ASE fill.

The systems and methods of the present disclosure may be applied to potential spectrum sharing customers (submarine or terrestrial) who want more autonomy in providing ASE loading everywhere in their allocation but do not want to preload an entire channel plan. Another embodiment may also be considered as a method to handle foreign modems of any type, within the limits of the OCM sensor to detect the real edges for each new channel as it is turned up at the spectrum monitoring input port. The more resolution in the OCM the better for this type of channel discovery method. Thus, a foreign modem characteristic could be discovered when connected to a spectrum monitoring port or through other OCM monitoring locations in the systems. Another concept of OCM monitoring comes from a capability at an ingress port of the line system and includes the capability to monitor and alarm the incoming spectrum to enforce pre-defined rules via alarming or action (e.g., notification of ASE replacement).

A list of the types of rules for detected power may include:

a) Optical power outside of the allocated spectral range for that customer port (above a detection threshold)

b) A difference between the current spectrum and a previously defined baseline, where the baseline is used as a mean value at each pixel for the allocated spectrum. There may be several possible methods to define a power mask/threshold range for any pixel, for any group of adjacent pixels, and/or for the ensemble as a whole c) These rules would reflect a policy or plan that the spectrum owner would agree to with the spectrum customer

Channel Auto-Provisioning Process

Figure 8:
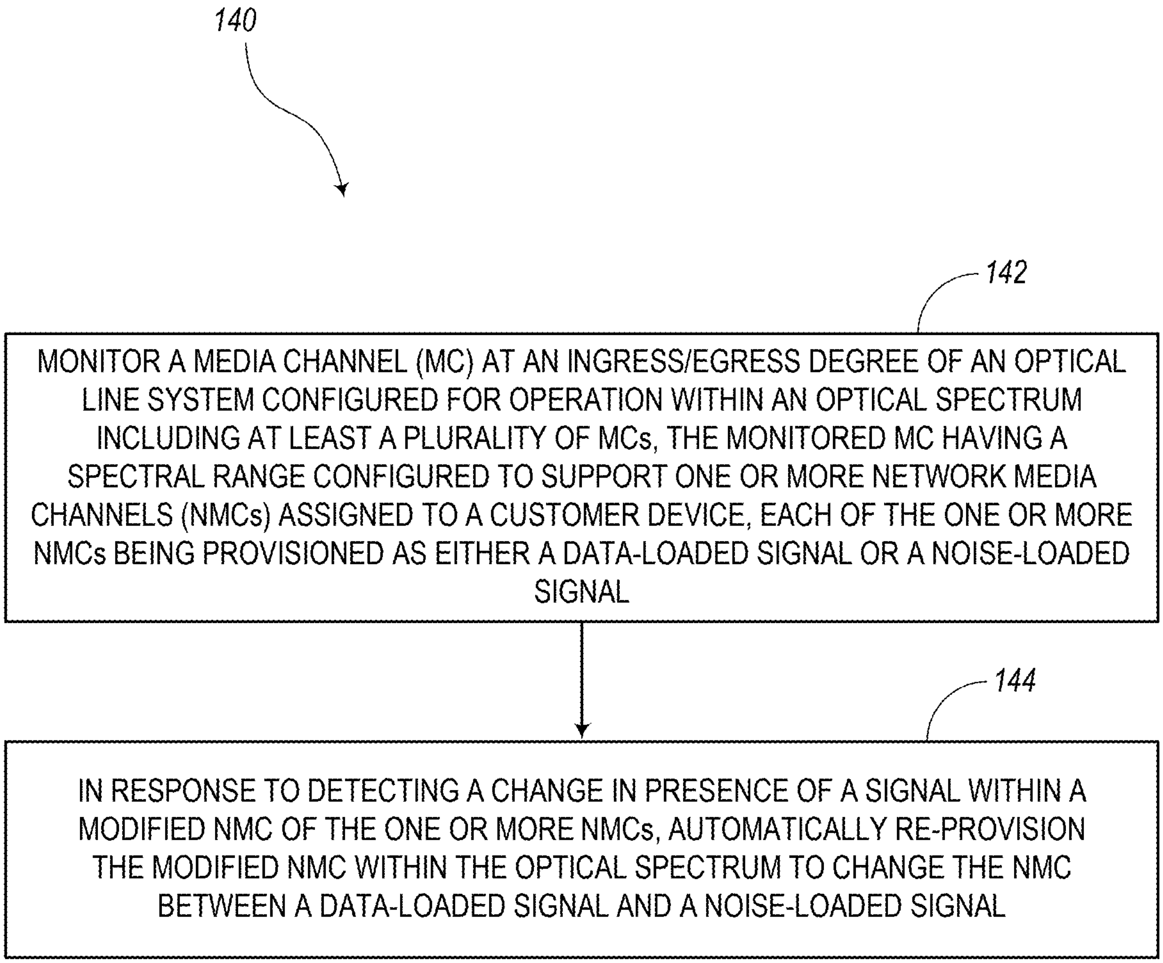
FIG. 8 is a flow diagram illustrating a process for automatically provisioning NMCs in an optical spectrum, according to various embodiments.

FIG. 8 is a flow diagram illustrating an embodiment of a process 140 for automatically provisioning NMCs in an optical spectrum. The process 140 includes a step of monitoring a Media Channel (MC) at an ingress/egress degree of an optical line system configured for operation within an optical spectrum including at least a plurality of MCs, as indicated in block 142. The monitored MC has a spectral range configured to support one or more Network Media Channels (NMCs) assigned to a customer device. Also, each of the one or more NMCs is provisioned as either a data-loaded signal or a noise-loaded signal. In response to detecting a change in presence of a signal within a modified NMC of the one or more NMCs, the process 140 includes a step of automatically re-provisioning the modified NMC within the optical spectrum to change the NMC between a data-loaded signal and a noise-loaded signal, as indicated in block 144.

According to some embodiments, the noise-loaded signal may be an Amplified Spontaneous Emission (ASE) filled signal. The step (block 144) of detecting the change in the presence of the signal may include discovering the presence of a new data-loaded signal. In this case, the step of automatically re-provisioning the modified NMC within the optical spectrum may include the steps of a) removing an ASE filled signal spectrum from the optical spectrum, and b) adding the new data-loaded signal to the optical spectrum. The step (block 144) of detecting the change in the presence of the signal may alternatively include discovering an absence of a previously existing data-loaded signal. In this case, the step of automatically re-provisioning the modified NMC within the optical spectrum may include the steps of a) removing the previously existing data-loaded optical signal from the optical spectrum, and b) adding an ASE filled signal spectrum to the optical spectrum.

The process 140 may be further configured whereby the step of automatically re-provisioning the modified NMC (block 144) may be performed without intervention by a network operator associated with the optical line system or a customer associated with the customer device. The ingress/egress degree, for example, may be part of a Reconfigurable Optical Add/Drop Multiplexer (ROADM) device or a Wavelength Selective Switching (WSS) component of the optical line system. In some embodiments, the optical spectrum may be provisioned for a plurality of customer devices each associated with a different MC of the plurality of MCs. Also, each MC may have a different spectral range including one or more NMCs, wherein the step of automatically re-provisioning (block 144) may be performed independently for each customer device. In some embodiments, the one or more NMCs may include a plurality of NMCs having a variable range of wavelengths and a variable range of acceptable Power Spectral Density (PSD) levels. The process 140 may further include a step of initially provisioning a customer plan as a baseline before the step of monitoring the MC, where the customer plan may be configured, among other things, to partially define the spectral range of the MC. The step of detecting the change in the presence of the signal within the modified NMC may include a comparison with the baseline.

Additional Implementations

Using the spectral monitoring capability and control functions described herein, it is possible to make spectrum sharing easier to use. Also, using the same monitoring and control capabilities is configured to automate the detection and notification of new foreign channels coming into the degree. In one example, the spectrum monitoring may include plug and play features.

Using the newly available monitoring capability offered by the spectrum monitoring devices allows for a more autonomous and faster configuration changes of the assigned spectral range by spectrum customers. Also, one use of the spectrum monitoring device (e.g., SSM) for either terrestrial or submarine applications may include monitoring channels to detect the presence of a new input channel or optical power in multiple adjacent slices, which may be a new channel, and automatically adding the new channel to the entire optical spectrum for the optical line system. Also, the systems may automatically notify the spectrum owner of the new power present inside the allocated spectral range to be admitted. One benefit of this, for example, is that a differentiated shared spectrum implementation may reduce the operational effort required for both line system owners and spectrum customers.

One problem with bringing the auto-provisioning concept from submarine optics systems to terrestrial optics systems was that managing channel configurations would be onerous for customers, especially if they had to experience the delays associated with communicating requests with the line system owners and waiting for the line system owners to make any channel changes. Therefore, the systems and methods of the present disclosure are configured to eliminate this tedious process and enable immediate (or at least greatly simplified) re-provisioning of add/drop operations.

The present systems and methods are configured to have visibility as to the optical spectrum entering and leaving a line system prior to making a cross connect with a WSS device. The OCMs can discover the status of the spectrum and the light within the range of that cross connect. The spectrum monitoring allows the systems to see whether or not data-carrying signals are there before the cross connect is made. If the signals are outside the proper wavelength range, this can be detected.

According to various embodiments, a target application may be spectrum leasing or spectrum sharing. The line system owner can assign each customer a slice (MC) of spectrum (e.g., a specific spectral range from one wavelength to another) rather than one or more channels. Then, the line system owner can allow the customer to manage their slice any way that they see fit. With this arrangement, there is no longer a need for the shared spectrum customer and the line system owner to interact every time a change is made. If a customer wants to add or remove a channel, they no longer need to request a change and wait for several weeks for the request to be processed. Instead, a preliminary channel plan is initially agreed upon by both parties for a wavelength range or spectral range. Then, when the line system detects that one of a customer's channels shows up, it is simply added to the spectrum without question. Also, if a channel disappears, the line system simply removes it without question.

In a terrestrial system, according to the embodiments described herein, a customer may not want an extra expense of having a complex terminal connected to a spectrum sharing port. Instead, they may simply rely on the spectrum sharing terminal (or optical line system) to perform the ASE-filling functions as needed for the entire spectrum. This ASE management can be beneficial for the customers, since they do not need to replace ASE with data-carrying channels, and vice versa, but can rely on the systems described herein for the ASE management features in their NMCs and MCs. The ingress/egress degree 62 can perform the ASE replacement on a per-NMC basis inside any MC. Therefore, the present disclosure describes systems that are capable of detecting a signal and then driving the provisioning accordingly, which is often the reverse with respect to many conventional systems. This automation can streamline the procedures of a company (i.e., line system owner) and can reduce the number of man-hours, truck rolls, etc.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:

monitoring a Media Channel (MC) at an ingress/egress degree of an optical line system configured for operation within an optical spectrum including at least a plurality of MCs, the monitored MC having a spectral range configured to support one or more Network Media Channels (NMCs) assigned to a customer device, each of the one or more NMCs being provisioned as either a data-loaded signal or a noise-loaded signal, wherein monitoring includes using an Optical Channel Monitor (OCM) to tap into bidirectional pass-through lines between an Optical Cross-Connect (OXC) device of the ingress/egress degree and the customer device; and in response to detecting a change in presence of a signal within a modified NMC of the one or more NMCs, automatically re-provisioning the modified NMC within the optical spectrum to change the modified NMC between a data-loaded signal and a noise-loaded signal, wherein automatically re-provisioning includes re-provisioning or reconfiguring the OXC device to automatically allow usage of the modified NMC.

2. The method of claim 1, wherein the noise-loaded signal is an Amplified Spontaneous Emission (ASE) filled signal spectrum.

3. The method of claim 2, wherein detecting the change in the presence of the signal includes discovering the presence of a new data-loaded signal, and wherein the step of automatically re-provisioning the modified NMC within the optical spectrum includes steps of:

removing an ASE filled signal spectrum from the optical spectrum; and adding the new data-loaded signal to the optical spectrum.

4. The method of claim 2, wherein detecting the change in the presence of the signal includes discovering an absence of a previously existing data-loaded signal, and wherein the step of automatically re-provisioning the modified NMC within the optical spectrum includes steps of:

removing the previously existing data-loaded signal from the optical spectrum; and adding an ASE filled signal spectrum to the optical spectrum.

5. The method of claim 1, wherein the step of automatically re-provisioning the modified NMC is performed without intervention by a network operator associated with the optical line system or a customer associated with the customer device.

6. The method of claim 1, wherein the ingress/egress degree is part of a Reconfigurable Optical Add/Drop Multiplexer (ROADM) device or a Wavelength Selective Switching (WSS) component of the optical line system.

7. The method of claim 1, wherein the optical spectrum is provisioned for a plurality of customer devices each associated with a different MC of the plurality of MCs, each MC having a different spectral range including one or more NMCs, and wherein the step of automatically re-provisioning is performed independently for each customer device.

8. The method of claim 1, wherein the one or more NMCs include a plurality of NMCs having a variable range of wavelengths and a variable range of acceptable Power Spectral Density (PSD) levels.

9. The method of claim 1, further comprising a step of initially provisioning a customer plan as a baseline before the step of monitoring the MC, the customer plan defining the spectral range of the MC, wherein detecting the change in the presence of the signal within the modified NMC includes a comparison with the baseline.

10. An ingress/egress degree of an optical line system configured for operation within an optical spectrum including at least a plurality of Media Channels (MCs), the ingress/egress degree comprising:

a spectrum monitoring device including a first Optical Channel Monitor (OCM) configured to monitor an MC having a spectral range configured to support one or more Network Media Channels (NMCs) assigned to a customer device, each of the one or more NMCs being provisioned as either a data-loaded signal or a noise-loaded signal, wherein the first OCM is configured to tap into bidirectional passthrough lines between an Optical Cross-Connect (OXC) device and the customer device; and an auto-configuring device including a second OCM, a controller, and an amplifier for injecting Amplified Spontaneous Emission (ASE) configured, in response to detecting a change in presence of a signal within a modified NMC of the one or more NMCs, to automatically re-provision the modified NMC within the optical spectrum to change the modified NMC between a data-loaded signal and a noise-loaded signal, wherein the second OCM is configured to monitor presence, usage, or occupancy of data-carrying channels at a line side of the ingress/egress degree, and wherein the controller is configured to re-provision or reconfigure the OXC device based on monitoring by the first OCM and the second OCM.

11. The ingress/egress degree of claim 10, wherein the ingress/egress degree is part of a Reconfigurable Optical Add/Drop Multiplexer (ROADM) device or a Wavelength Selective Switching (WSS) component of the optical line system.

12. The ingress/egress degree of claim 10, further comprising an Optical Cross-Connect (OXC) device for channel cross-connect functionality, for demultiplexing incoming signals and multiplexing outgoing signals.

13. The ingress/egress degree of claim 12, wherein the first OCM is an ingress OCM configured to detect a change in presence of the incoming signals associated with the modified NMC causing the re-provisioning of the modified NMC between a data-loaded signal and a noise-loaded signal.

14. The ingress/egress degree of claim 12, wherein the second OCM is an egress OCM configured to detect a change in presence of the outgoing signals associated with the modified NMC causing the re-provisioning of the modified NMC between a data-loaded signal and a noise-loaded signal.

15. The ingress/egress degree of claim 10, wherein the customer device is a Network Element (NE) configured for use in one or more of a terrestrial optical system and a submarine optical system.

16. The ingress/egress degree of claim 10, wherein the spectrum monitoring device is configured to bidirectionally detect the change in the presence of data-loaded signal using the first OCM via one or more taps into bidirectional passthrough lines between the OXC device and the customer device based on customer initiated channel adding or remote channel adding.

17. A non-transitory computer-readable medium configured to store an automatic channel provisioning program having logical computer code with instructions that enable a processing device to perform steps of:

monitoring a Media Channel (MC) at an ingress/egress degree of an optical line system configured for operation within an optical spectrum including at least a plurality of MCs, the monitored MC having a spectral range configured to support one or more Network Media Channels (NMCs) assigned to a customer device, each of the one or more NMCs being provisioned as either a data-loaded signal or a noise-loaded signal, wherein monitoring includes using an Optical Channel Monitor (OCM) to tap into bidirectional passthrough lines between an Optical Cross-Connect (OXC) device of the ingress/egress degree and the customer device; and in response to detecting a change in presence of a signal within a modified NMC of the one or more NMCs, automatically re-provisioning the modified NMC within the optical spectrum to change the modified NMC between a data-loaded signal and a noise-loaded signal, wherein automatically re-provisioning includes re-provisioning or reconfiguring the OXC device to automatically allow usage of the modified NMC.

18. The non-transitory computer-readable medium of claim 17, wherein the noise-loaded signal is an Amplified Spontaneous Emission (ASE) filled signal spectrum.

19. The non-transitory computer-readable medium of claim 18, wherein detecting the change in the presence of the signal includes one or more of:

discovering the presence of a new data-loaded signal, wherein automatically re-provisioning the modified NMC within the optical spectrum includes a) removing an ASE filled signal spectrum from the optical spectrum and b) adding the new data-loaded signal to the optical spectrum; and discovering an absence of a previously existing data-loaded signal, wherein automatically re-provisioning the modified NMC within the optical spectrum includes a) removing the previously existing data-loaded signal from the optical spectrum and b) adding an ASE filled signal spectrum to the optical spectrum.

20. The non-transitory computer-readable medium of claim 17, wherein automatically re-provisioning the modified NMC is performed without intervention by a network operator associated with the optical line system or a customer associated with the customer device.

* * * * *